(12) United States Patent
Molla

(10) Patent No.: US 11,639,771 B2
(45) Date of Patent: May 2, 2023

(54) INTEGRATED SYSTEM AND METHOD FOR AUTOMATIC REJUVENATION OF TURBINE OIL FOR IMPROVING EQUIPMENT RELIABILITY

(71) Applicant: SAUDI ARABIAN OIL COMPANY, Dhahran (SA)

(72) Inventor: Hasanur Jamal Molla, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 206 days.

(21) Appl. No.: 17/170,000

(22) Filed: Feb. 8, 2021

(65) Prior Publication Data

US 2022/0252220 A1  Aug. 11, 2022

(51) Int. Cl.
*F16N 7/38* (2006.01)
*F16N 31/00* (2006.01)
*F02C 7/06* (2006.01)
*F16N 29/04* (2006.01)

(52) U.S. Cl.
CPC ............... *F16N 29/04* (2013.01); *F02C 7/06* (2013.01); *F16N 7/38* (2013.01); *F16N 31/00* (2013.01); *F05D 2220/32* (2013.01); *F05D 2260/98* (2013.01); *F16N 2200/02* (2013.01); *F16N 2210/02* (2013.01); *F16N 2250/18* (2013.01); *F16N 2270/50* (2013.01)

(58) Field of Classification Search
CPC ......... F16N 31/00; F16N 7/38; F16N 2200/00
USPC ......................................................... 184/7.4
See application file for complete search history.

(56) References Cited

U.S. PATENT DOCUMENTS

| 5,518,590 A | 5/1996 | Fang |
| 5,568,842 A | 10/1996 | Otani |
| 5,701,862 A | 12/1997 | Inoue et al. |
| 5,749,339 A * | 5/1998 | Graham ............ F01M 11/0458 123/73 AD |
| 5,964,318 A * | 10/1999 | Boyle .................... F01M 11/12 123/196 S |

(Continued)

FOREIGN PATENT DOCUMENTS

JP    2018063213 A    4/2018

OTHER PUBLICATIONS

Lopez, Patricia et al., "Low Cost Photonic Sensor for in-Line Oil Quality Monitoring: Methodological Development Process towards Uncertainty Mitigation", Sensors, MDPI, vol. 18, No. 2015, Jun. 2018, pp. 1-37 (37 pages).

(Continued)

*Primary Examiner* — Michael R Mansen
*Assistant Examiner* — Mark K Buse
(74) *Attorney, Agent, or Firm* — Osha Bergman Watanabe & Burton LLP

(57) ABSTRACT

Systems and methods for automatic maintenance of lube oil quality include a storage tank for storing fresh lube oil, a lube oil reservoir containing a volume of operational lube oil, and an oil disposal tank. A first controllable flow system transports lube oil from the reservoir to the oil disposal tank, and a second controllable flow system transports fresh lube oil from the storage tank to the reservoir. Provided are a level transmitter to measure a level of lube oil within the reservoir and an antioxidant sensor to measure a concentration of antioxidant level inside the lube oil reservoir. A control system activates and deactivates the first controllable flow system based upon the concentration of antioxidant measured by the antioxidant sensor, and activates and deactivates the second controllable flow system based upon the level of lube oil measured by the level transmitter.

18 Claims, 4 Drawing Sheets

(56) References Cited

U.S. PATENT DOCUMENTS

| | | | |
|---|---|---|---|
| 6,196,057 B1 | 3/2001 | Discenzo | |
| 6,283,082 B1 * | 9/2001 | Gunshore | F01M 11/0458 |
| | | | 123/196 S |
| 6,459,995 B1 | 10/2002 | Collister | |
| 7,043,402 B2 | 5/2006 | Phillips et al. | |
| 7,134,323 B1 | 11/2006 | Discenzo | |
| 7,143,867 B2 * | 12/2006 | Chopra | F01M 11/12 |
| | | | 184/104.2 |
| 7,275,420 B2 | 10/2007 | Discenzo | |
| 7,581,434 B1 * | 9/2009 | Discenzo | G01N 33/2888 |
| | | | 73/53.01 |
| 7,690,246 B1 | 4/2010 | Discenzo | |
| 8,155,891 B2 | 4/2012 | Kong et al. | |
| 2006/0169031 A1 | 8/2006 | Song et al. | |
| 2007/0272209 A1 | 11/2007 | Matsiev et al. | |
| 2010/0014087 A1 * | 1/2010 | Takahashi | F16C 33/667 |
| | | | 356/442 |
| 2011/0041796 A1 | 2/2011 | Sachdev et al. | |
| 2012/0243998 A1 * | 9/2012 | Becker | F16N 39/06 |
| | | | 416/169 R |
| 2016/0061805 A1 * | 3/2016 | Prabhu | G01N 33/30 |
| | | | 73/114.55 |

OTHER PUBLICATIONS

International Search Report and Written Opinion issued in corresponding PCT International Application No. PCT/US2022/015621 dated May 9, 2022 (56 pages).

\* cited by examiner

INTEGRATED SYSTEM AND METHOD FOR AUTOMATIC REJUVENATION OF TURBINE OIL FOR IMPROVING EQUIPMENT RELIABILITY

BACKGROUND

Lubrication is an important aspect of maintaining machinery in proper operating condition. Turbines, compressors, pump, engines and motors include many metallic parts, such as bearings, shafts, pistons, cylinders, crankshafts, connecting rods, and joints, that require proper lubrication between their moving surfaces to decrease friction, prevent contamination, reduce wear and dissipate heat. For example, when lubricant is continuously exposed to high temperatures, high speeds, stress or loads, and/or an oxidizing environment, the lubricant will deteriorate and lose its lubricating effectiveness. The loss of lubricating effectiveness will affect two crucial functions of a lubrication system: (1) reducing friction; and (2) removing heat. Continued operation of such degraded system may result in even greater heat generation, further exacerbating system degradation, eventually leading to substantial machinery damage and ultimately catastrophic failure. For this reason, conservative lubricant changing schedules, where the lubricating fluid is changed well before any degradation is expected to occur, are sometimes well worth what may be viewed as wasted labor, wasted lubricating fluid, and unnecessary machinery downtime if needed. However, the cost and labor associated with replacing adequate functioning lubricating fluid cannot be justified in other times. Additionally, the more frequent the changes, the higher the possibility that the wrong lubricating fluid will be provided and/or other changing mistakes will be made, such as over-lubricating equipment. Therefore, there is a balance to find: on one hand, it is undesirable to replace an adequate lubricant, but on the other hand, it is desired to replace a lubricant that is in its initial stages of breakdown or contamination prior to equipment damage.

To protect the system (e.g., turbine, compressor, motor, pump, engine, gearbox, etc.), the lubricant should be changed in a timely fashion. Measurements relating to machine fluids obtained from sensing elements and/or lubricant sampling and laboratory analysis are utilized to prevent substantial degradation of the equipment. However, even if such measurements are taken at regular intervals, a maintenance engineer is still required to effectuate maintenance tasks (e.g., fluid addition, fluid replacement, addition of antioxidants, etc.). Furthermore, the maintenance engineer is prone to human error and can add incorrect fluids and/or fluid additives to a particular machine or machine component, as well as provide the machine or machine component with an over-abundance of fluid. Access to some machines for fluid service may require access to hazardous areas by maintenance personnel or may require machinery or process shutdown to ensure worker safety. The additional risk of worker safety and possible machinery shutdown for lubricant service must be minimized to provide ultimate protection of maintenance staff and continued operation of process machines. These risks, operating cost, and other potential maintenance errors can result in accelerated failure of the machine and/or machine component, increased worker risk, and reduced economic performance.

In addition, lubrication degradation is difficult to predict. In many situations, a lubricating fluid will reach at least the initial stages of breakdown or contamination well before even a conservative scheduled change. The potential damage associated with inadequate bearing lubrication and the uniqueness of each lubrication situation has led many industries to adopt programs of periodic monitoring and analysis of the lubricating fluid. For example, metal wear during operation can contaminate a fluid with metal particles, which can be a problem not easily detectable in a useful way. Detecting metal in fluids is either performed by extracting a sample and performing a laboratory analysis or in-situ measurement and analysis.

A lot of money is spent each year on outside lab analysis of fluids and for staff time and on-site analysis. There are many lubricant analysis techniques that include lab analysis methods (e.g., titration methods) and sensor-based methods (e.g., pH sensors, $H_2O$ sensors, dielectric sensors). However, lab analysis techniques are limited due to the time delay before a lubricant analysis is available, possible contamination of the samples extracted for analysis, the cost required for the analysis, and the difficulty in determining what corrective action is needed and when. An early diagnosis and cure of lubrication related problems can be extremely beneficial in reducing machine down-time, repair cost, inconvenience, and even hazardous situations.

In-situ analysis needs a sensing device in a position wherein the lubricating fluid will flow directly across the sensing elements. For example, the sensing device can be a temperature sensor, a pH sensor, a dielectric sensor, an oxidation-reduction potential sensor, and a viscosity sensor.

The most common form of lubricant degradation is oil oxidation. Antioxidants, such as hindered phenols and alkyl diphenylamines, are introduced in the oil as additives to minimize oil oxidation. The rate of consumption of oil antioxidants determines the remaining useful life of a lubricant in service. Once the original oil antioxidant concentration is depleted to around 10-20%, the desired oil qualities can begin a sudden and dramatic decline. Eventually, this decline allows large changes to occur in the physical properties of the lubricant, where the lubricant is no longer capable of protecting the equipment and its useful life ends. Thus, if the respective fluid is left in service and this oil degradation mechanism progresses, continued equipment operation will inevitably lead to severe component damage, and possibly catastrophic failure.

Most additives have potential to cause equipment harm if present in excess. Therefore, current practice represents a trade-off between incorporating large concentrations of additive to extend oil change intervals and minimizing additive content to limit its potential for harm.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

One or more embodiments relate to systems for automatic maintenance of lube oil quality. The system may include a storage tank for storing a volume of fresh lube oil, a lube oil reservoir containing a volume of operational lube oil, and an oil disposal tank. The system may also include a first controllable flow system for transporting lube oil from the lube oil reservoir to the oil disposal tank, and a second controllable flow system for transporting fresh lube oil from the storage tank to the lube oil reservoir. A level transmitter may be provided to measure a level of lube oil within the lube oil reservoir, and an antioxidant sensor may be provided to measure a concentration of antioxidant level of operational lube oil inside the lube oil reservoir. Further, the system may include a control system configured to activate and deactivate the first controllable flow system based upon the concentration of antioxidant measured by the antioxidant sensor, and to activate and deactivate the second controllable flow system based upon the level of lube oil measured by the level transmitter.

One or more embodiments relate to processes for automatic maintenance of lube oil quality. The processes may include measuring, with an antioxidant sensor, a concentration of antioxidant contained in a lube oil stored in a lube oil reservoir. The processes may also include measuring, with a level sensor, a level of lube oil within the lube oil reservoir. The processes may further include: automatically activating and deactivating, via a control system, a first controllable flow system based only upon the concentration of antioxidant measured by the antioxidant sensor, and, automatically activating and deactivating, via the control system, a second controllable flow system based only upon the level of lube oil measured by the level sensor.

Other aspects and advantages of this disclosure will be apparent from the following description made with reference to the accompanying drawings and the appended claims.

DETAILED DESCRIPTION

As discussed briefly above, varnish is formed due to the degradation of lubricating oil, also referred to herein as lube oil or turbine oil, and varnish formation is one of the leading causes of rotating equipment failures in industry. One of the most critical additives in lube oil formulations is antioxidants, which protect the lube oil molecules from oxidative degradation. However, antioxidant additive is sacrificial in nature and gets consumed over time. Therefore, it is important to keep monitoring the antioxidant level in in-service lube oil and maintain an adequate level of antioxidant by introducing fresh lube oil to protect lube oil from degradation and prevent varnish formation.

The industry generally monitors the in-service lube oil for varnish, and either fully replaces the in-service lube oil by fresh lube oil followed by chemical cleaning and system flushing, or use varnish removal filter to remove the varnish from in-service lube oil. The first option is a very expensive and time-consuming process, while the second option only removes the degraded by-products, but does not guarantee to stop further degradation by ensuring adequate antioxidant level in in-service lube oil.

Embodiments of the present disclosure are related to an integrated system and method for automatic rejuvenation of lubricating oil to improve equipment reliability. In various embodiments, the target applications are turbine and compressor systems having a large lubricant oil reservoir size. More specifically, embodiments herein are directed toward integrated systems and methods to monitor and maintain a healthy antioxidant level in in-service lube oil. Even more specifically, embodiments herein are directed toward integrated systems and methods for online detection of antioxidant package in in-service turbine oil, and automatic partial replenishment of in-service turbine oil with fresh turbine oil to keep the in-service turbine oil healthy by maintaining its antioxidant level in order to improve critical rotating equipment reliability by eliminating varnish formation from lube oil oxidation.

The integrated systems according to embodiments herein may include an autonomous lubricant analysis system that facilitate real-time in-situ measurements, analysis, and automatic maintenance. Systems herein may include a measurement system and processors for data analysis, automatic predictive maintenance, and control of a closed loop system with reservoirs, control valves, and circulating pumps to control, in real-time, the lubricating oil inside the closed loop system. The capacity of the circulating pumps, reservoirs/tanks, and control valves are as per an individual machine's lubrication system requirement.

Figure 1:
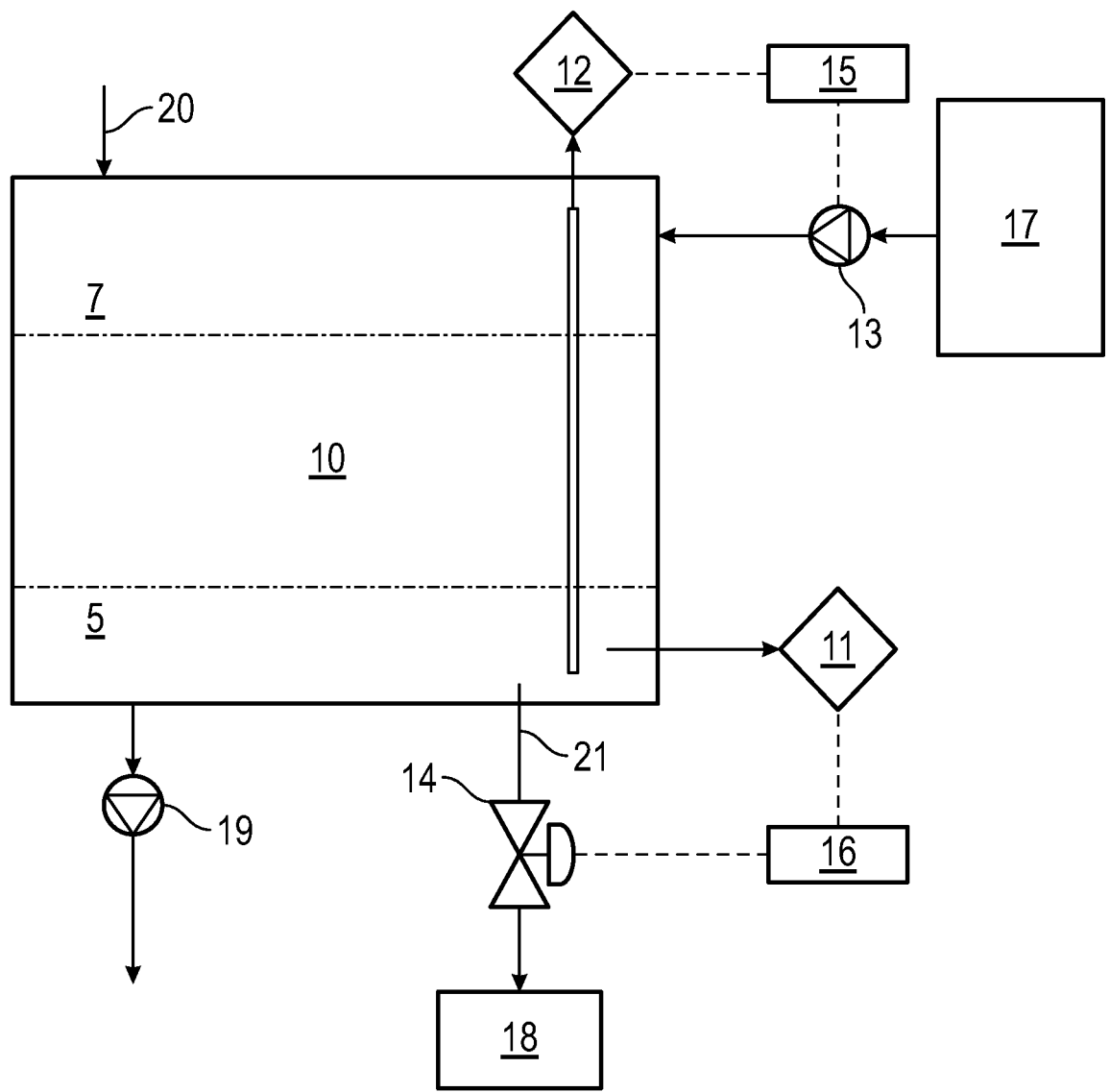
FIG. 1 is a schematic diagram of an on-line monitoring system according to embodiments herein.

A schematic diagram of an in-situ monitoring system according to embodiments herein is shown in FIG. 1. In one or more embodiments, the in-situ monitoring system may include a lube oil reservoir (10), at least one oil information monitoring sensor (11 and 12), an automatic oil-filling system (13 and 17), at least one processor (15 and 16), and an automatic oil-collecting system (14 and 18).

The lube oil reservoir (10) may contain a volume of lube oil, and may be fluidly connected to the main system pump (19), providing oil continuously or intermittently to one or more pieces of equipment, such as a turbine or a compressor (not illustrated). Circulated oil may be returned from the equipment via an oil return line (20). Accordingly, the lube oil within reservoir (10) may be a mixture of used and fresh lube oil. The quantity (level) of the lube oil contained within reservoir (10) may be monitored, for example, using a level gauge/level transmitter (12). A quality of the lube oil contained within the lube oil reservoir (10) may also be monitored via one or more sensors, such as an antioxidant monitoring sensor (11).

The automatic oil-filling system may include, among other equipment, a storage tank (17), a fill pump (13), and a processor (15). Storage tank (17) may contain a volume of fresh lube oil. Fill pump (13) and associated piping may fluidly connect storage tank (17) and reservoir (10), allowing fresh lube oil to be intermittently provided from storage tank (17) to reservoir (10), thereby replenishing or replacing consumed lube oil. An inlet of the lube oil reservoir configured to receive fresh lube oil from the storage tank (17) is located below a maximum oil level (7) of the lube oil reservoir (10), wherein an oil circulating line for an antioxidant sensor is placed near an opening of a drain line (21) to dispose of lube oil with level of antioxidant below a pre-set minimum level. Processor (15) may be a stand-alone control unit associated with the oil-filling system or may be part of a larger local or remote digital control system associated with additional plant or process operations. The processor (15) may receive information, including the level of lube oil within reservoir (10), via level transmitter (12). The processor may also be configured to start or stop operations of fill pump (13) based on the transmitted level indicated by the level gauge. Alternatively, or additionally, the processor (15) may be configured to operate valves or other flow components (not illustrated) used to control a flow of fresh lube oil from storage tank (17) to reservoir (10).

The automatic oil-collecting system may include, among other equipment, a control valve (14), a processor (16), and an oil disposal tank (18). In some embodiments, a drain pump (not illustrated) may also be included. Valve (14) and/or a drain pump may fluidly connect lube oil reservoir (10) with the oil disposal tank (18) via the drain line (21). Oil disposal tank (18) may thus be used to receive and contain a volume of consumed lube oil from lube oil reservoir (10). Consumed lube oil received by disposal tank (18) may be properly disposed of, as needed, such that additional consumed oil may be received into oil disposal tank (18) when necessary.

As noted above, in one or more embodiments, the oil information monitoring sensors may include at least an antioxidant (AO) sensor (11) and a level transmitter (LT) (12). The antioxidant (11) and level transmitter (12) sensors may be connected to the lube oil reservoir (10) or the lube oil may be circulated from the equipment to the sensor, such as the antioxidant monitoring sensor (11), for continuous or periodic measurement of the lube oil quality (antioxidant content). In one or more embodiments, the antioxidant monitoring sensor (11) measures, in real-time, the concentration of antioxidant in the lube oil reservoir (10).

As mentioned above, as lube oil degrades due to friction, oxidation, temperature or contamination, the concentration of antioxidant decreases. The change in the concentration of antioxidant in the lube oil represents a condition change in the lube oil. Systems according to embodiments herein, such as illustrated in FIG. 1, may be used to monitor and maintain the lube oil at a healthy condition, having at least a minimum amount of antioxidant at all times.

The lube oil reservoir (10) may initially contain a quantity of lube oil having a desired quality, including a sufficient concentration of antioxidant. During operations of the plant and the equipment associated with lube oil reservoir (10), circulation of the lube oil and use of the lube oil within the equipment may deplete the concentration of antioxidant. As the lube oil within reservoir (10) is a mixture of fresh and used lube oil, the antioxidant level may slowly decrease over time. When the concentration of antioxidant decreases to a concentration lower than a minimum set value of the in-service lube oil, the system may automatically provide fresh lube oil, having a higher concentration of antioxidant, from the storage tank (17). Prior to supplying the reservoir (10) with fresh oil, however, a quantity of the consumed (low antioxidant level) lube oil may be removed from the lube oil reservoir (10).

The control system, including processor (16) for example, may send a command signal to the control valve (14) for opening, when the measured antioxidant concentration is below a set point value. When the control valve (14) is open, the in-service lube oil may drain into the oil disposal tank (18), lowering the oil level in the lube oil reservoir (10). In this manner, a quantity of used lube oil, including the oil degraded oxidative byproducts and lube oil having a low concentration of antioxidant, may be removed from the lube oil reservoir (10), effectively removing the low quality in-service lube oil from the circulation system and eliminating the possibility of varnish buildup.

Once the low set point level (5) is reached, fresh oil may then be provided to the lube oil reservoir (10). The control system, such as including processor (15), may send a command to the fill pump (13) to start pumping fresh lube oil from the storage tank (17) to the lube oil reservoir (10). The partial addition of fresh lube oil into the lube oil reservoir introduces fresh antioxidant additive, thereby increasing an overall concentration of antioxidant within the lube oil mixture contained within the lube oil reservoir. As the antioxidant concentration within the lube oil in reservoir (10) increases with the addition of fresh lube oil, the antioxidant monitoring sensor will sense the improved quality of the lube oil in reservoir (10) and may then send a command to control valve (14) to close, stopping flow of oil from reservoir (10) to oil disposal tank (18). Flow of fresh oil from storage tank (17) may continue until the level transmitter sensor (12) indicates that a desired volume of oil is reached within the lube oil reservoir (10), high set point level (7). The filling process may then be stopped, the level control system sending a command to fill pump (13) to stop. In this manner, the system as illustrated in FIG. 1 may be used to maintain a healthy antioxidant level in the in-service lube oil provided by the main pump to the equipment, and protect the in-service lube oil from oxidative degradation.

Figure 2:
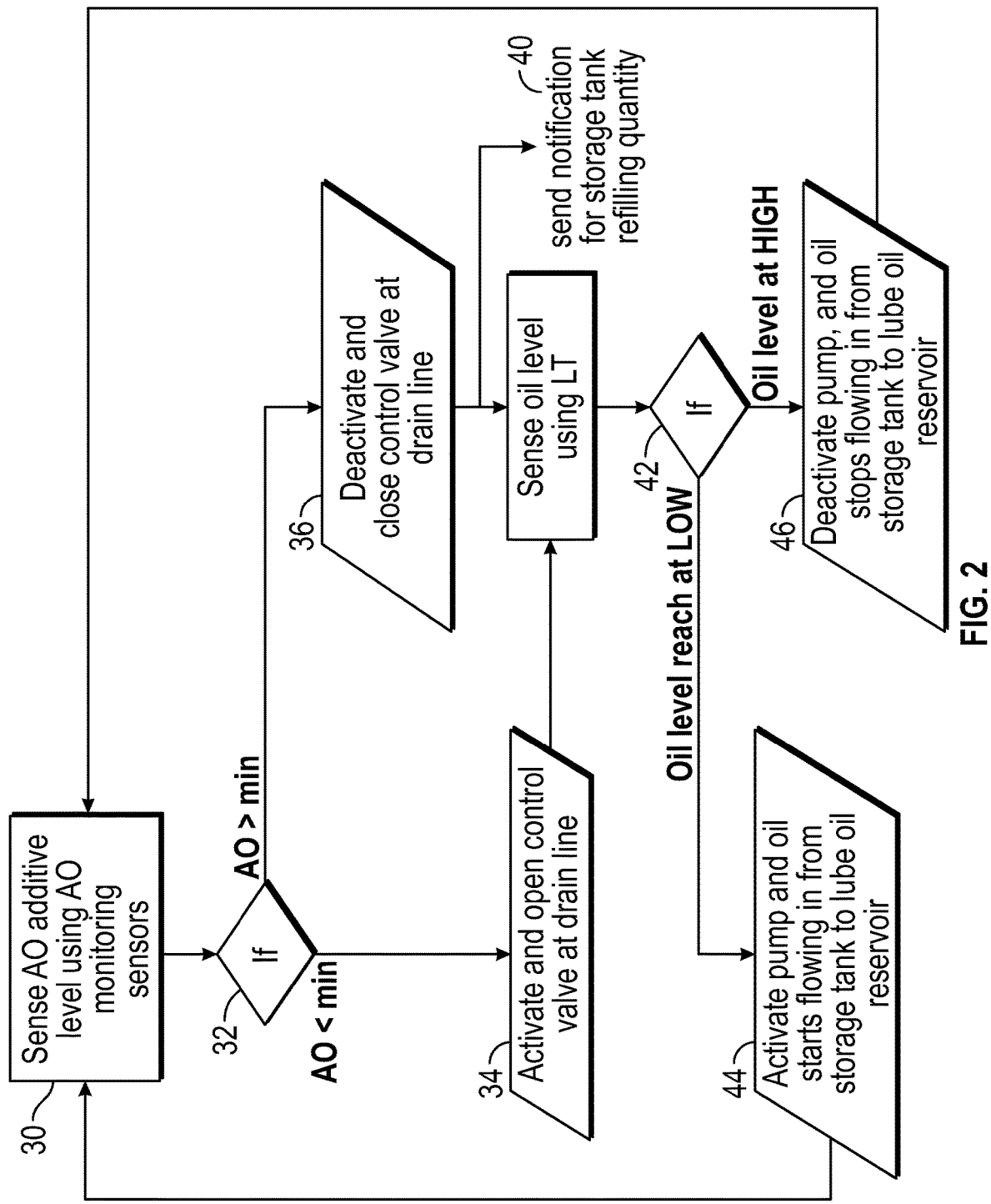
FIG. 2 is a schematic diagram of an on-line monitoring system according to embodiments herein.

A flow chart illustrating the logic and operation of the two individual, integrated, control loops is illustrated in FIG. 2. Embodiments herein may continuously monitor antioxidant concentration, in Loop 30-36, measuring or sensing the antioxidant concentration level using antioxidant monitoring sensor (11), while also, in Loop 40-46, continuously monitoring the level of lube oil within the lube oil reservoir (10).

Loop 30-36 includes a step 30, sensing the antioxidant level using the antioxidant monitoring sensor (11). In step 32, the processor (16) may monitor and determine if the antioxidant level is greater than or less than a minimum set point concentration. When the antioxidant concentration falls below a minimum value, the processor (16) is configured to activate and open control valve (14), as indicated in process step 34. When the antioxidant concentration is above the minimum set point concentration, the processor is configured in step 36 to deactivate and close the control valve (14).

While the antioxidant concentration is being monitored, Loop 40-46 includes a step 40 for measuring the level of lube oil in the lube oil reservoir (10). In step 42, the processor (15) may monitor and determine if the volume of lube oil within the reservoir is greater or less than a minimum set point level (LOW set point value (5)) and whether the volume of lube oil within the reservoir is greater or less than a maximum set point level (HIGH set point value (7)). When the lube oil is draining, withdrawing low antioxidant concentration lube oil to the disposal tank (18) the level decreases to the LOW set point. When it reaches the LOW set point, the processor (15) is configured, in step 44, to activate the fill pump (13), feeding fresh lube oil from storage tank (17) into lube oil reservoir (10). As the fresh lube oil has antioxidant at a higher concentration than the lube oil within reservoir (10), the concentration of antioxidant increases in the lube oil mixture, resulting in processor (16) closing control valve (14) as described above (step 36). The fresh lube oil then continues to be fed via pump (13) into the lube oil reservoir (10) until it reaches the HIGH set point, where the processor (15) is configured, in step 36, to deactivate fill pump (13), and oil stops flowing from storage tank (17) into reservoir (10).

To avoid short circuit of the fresh lube oil during the short period of time where both control valve (14) may be open and fill pump (13) may be operational, the fill and drain lines may be disposed on opposite sides of the lube oil reservoir, a mixer may be used, or baffling may be provided. Similarly, it may be desirable to locate sensor (11) at a location within reservoir (10) that would not be strongly influenced by either the fresh lube oil feed or the outflowing "old" lube oil.

In some embodiments, the sensor (11) may be located close to the fresh lube oil feed inlet. In this manner, the antioxidant sensor system may rapidly recognize that fresh lube oil is being introduced, and, due to the continuous measurement of antioxidant quantity, may essentially immediately shut off drain valve (14) so as to prevent loss of freshly introduced lube oil and the accompanying antioxidant through the drain valve. Accordingly, a "close" location would be understood by one skilled in the art as within a region that would be quickly influenced by mixing of the fresh lube oil with the lube oil already in the tank upon start of feed, not requiring significant time for the convective mixing of the fresh oil to trigger a change in measurement and closure of the drain valve. Placing the sensor in such a location would also minimize the complexity of the programming needed to perform the partial drain and fill operation while timely triggering the drain valve operation so as to prevent unnecessary loss of fresh lube oil.

As described above, a level transmitter (LT) may monitor the oil level in the reservoir and facilitates the activation/deactivation of a circulating pump placed between a storage tank and the reservoir based on lube oil level. When lube oil level in the reservoir goes below a set value, then the circulating pump gets activated and starts transferring the fresh oil from storage tank to reservoir. The introduction of fresh lube oil in reservoir increases the oil level and improves the antioxidant level of the in-service lube oil. The antioxidant sensor facilitates closure of a drain valve when the antioxidant level is higher than set minimum value because of introduction of fresh oil. The oil level in the reservoir increases because of stopping of draining the in-service oil through control valve, and introduction of fresh oil in reservoir through the circulating pump. When the oil level in the reservoir reaches a set high level, the LT facilitates deactivation of the circulating pump, and stops delivering fresh oil from the storage tank to the reservoir. Therefore, embodiments herein may always maintain the oil as healthy oil in the reservoir by means of draining degraded oil through control valve and introducing fresh oil through circulating pump controlled by the antioxidant sensor and LT.

Systems and processes herein may thus be configured for: (i) monitoring of only the anti-oxidant level in in-service lube oil, (ii) automatic partial draining of in-service oil to reduce the load of degraded byproducts, and (iii) automatic refilling of fresh lube oil to maintain the healthy anti-oxidant level in in-service lube oil and facilitate refilling the storage tank by continuously monitoring the available fresh lube oil quantity. Embodiments herein may facilitate the same first fill lube oil to be used until the end of machine life cycle without the need for a single complete lube oil replacement.

Embodiments herein may replenish the level of lube oil within lube oil reservoir (10), as described above. However, it should be noted that the amount of lube oil input into the reservoir may not equal the amount drained. In addition to the mixing of fresh and depleted lube oil, the amount of lube oil in the reservoir may be impacted by leakage, consumption, or conversion, such as at points of use, including the equipment such as compressors and turbines that may be fed lube oil via pump (19).

In embodiments herein, the level transmitter (LT) (12) monitors the oil level in the lube oil reservoir (10) as described with respect to FIGS. 1 and 2. When the level of the lube oil reservoir (10) drops to a pre-determined minimum set value, regardless of the cause of the lower level of the in-service lube oil (whether it is due to oil leakage or oil drainage for instance), the level transmitter (12) sends a signal to the processor (15), which commands the circulating pump (13) for activation of the automatic oil filling system. The circulating pump (13) starts pumping fresh lube oil from the storage tank (17) to the lube oil reservoir (10).

The introduction of fresh lube oil in the lube oil reservoir (10) increases the oil level and improves the antioxidant level in the in-service lube oil. When the level of the lube oil reservoir (10) reaches a pre-determined maximum set value, the level transmitter (12) sends a signal to the processor (15), which commands the circulating pump (13) for deactivation of the automatic oil filling system.

Embodiments herein may also be configured to monitor the number of partial drain/refill cycles, and to provide alerts or notifications to facilitate the logistics surrounding one or both of storage tank (17) and disposal tank (18). Storage tank (17), for example, may contain a significantly greater quantity of lube oil than is needed for a single partial drain/refill cycle. As the fresh lube oil is periodically fed to lube oil reservoir (10), the level of lube oil in the storage tank (17) will decrease. Similarly, disposal tank (18) may have a larger volume than lube oil reservoir (10) but will itself need to be periodically emptied so as to hold additional partial drain volumes. Processors (15) and (16) may be configured to estimate when additional fresh lube oil will be needed for storage tank (17) and/or when disposal tank (18) may need to be emptied.

In one or more embodiments, the processor (15) records the number of partial oil replacements (N), that occurred since the last filling of the storage tank (17), and estimates the volume of fresh oil left in the storage tank (17) at any point of time, which corresponds to [Y−(N×X)], where X is the partial replacement quantity equal to the volume of oil in the lube oil reservoir (10) between the pre-determined set "LOW" and "HIGH" limits, and Y is the initial volume of oil in the storage tank.

The quantity of oil in storage tank (17) is desired to be maintained greater than a minimum value and should be at least greater than the amount of oil used for a single partial oil replacement cycle. If the fresh oil quantity estimated to be left in the storage tank (17) is lower than the quantity required for a partial replacement (X), then the processor (15) may send a notification to operations for refilling the storage tank (17) with a quantity of fresh oil. The processor (15) may, for example, be configured to display a notification on a monitor, or may generate a work order for carrying out the refilling of the storage tank (17) with fresh oil. The processor (15) ensures the storage tank has always adequate fresh lube oil quantity to carry out the following partial refilling. In some embodiments, through the plant network, the data from the data acquisition system can be accessed remotely by different users at the same time.

Refilling of the storage tank (17) should occur before the quantity of oil remaining in the storage tank (17) is less than the quantity required for the partial replacement. It is also recognized that delivery of fresh oil or disposal of consumed oil may need to be scheduled, and same day delivery or disposal may not always be possible. Processors of some embodiments herein may also be configured to provide notifications or displays to prompt scheduling of such deliveries or withdrawals.

Figure 3:
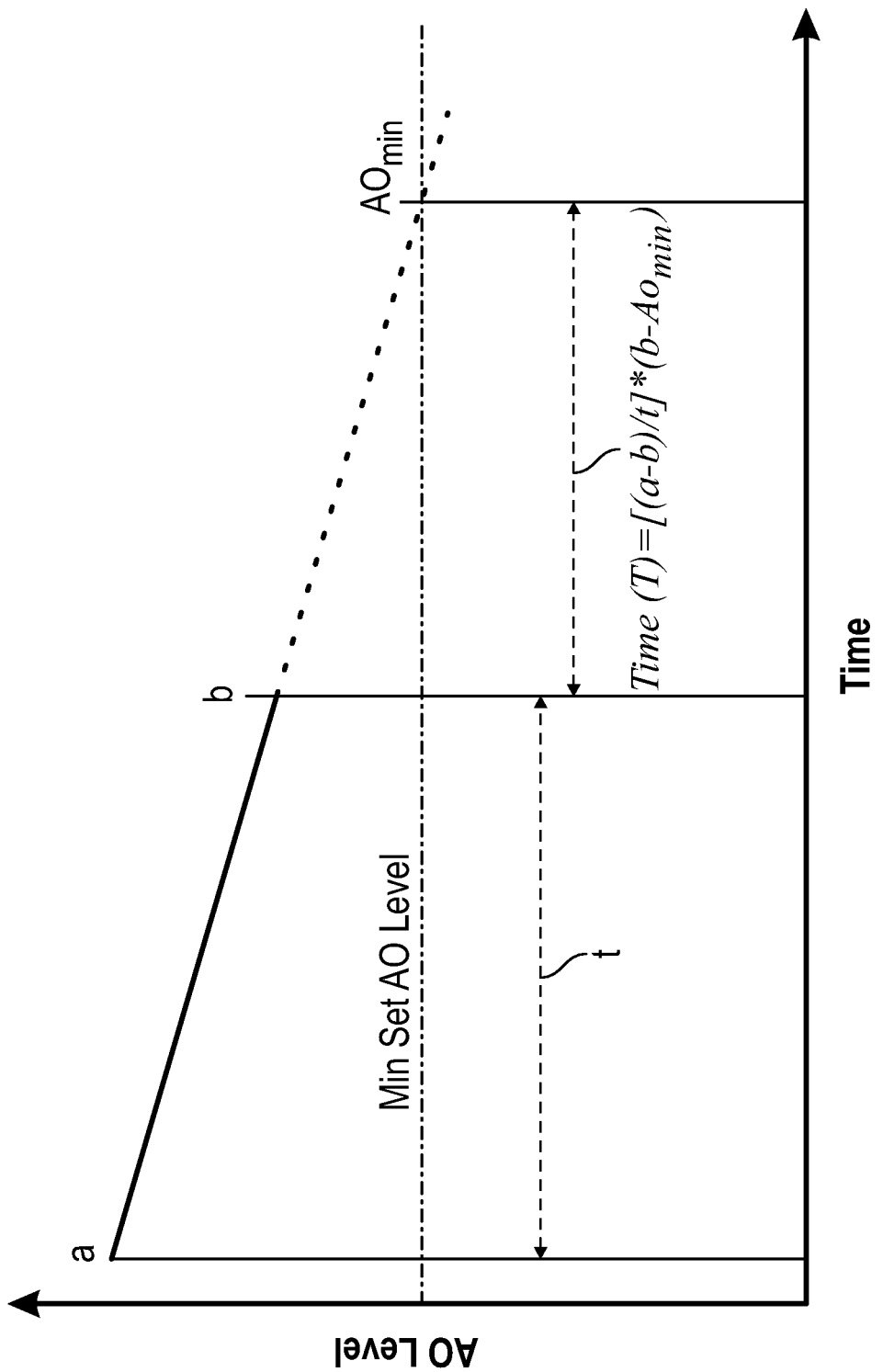
FIG. 3 illustrates a projection of antioxidant concentration versus time according to embodiments herein.

For example, in one or more embodiments, the processor (16) may be configured to determine, in real-time, a predictive maintenance strategy, such as illustrated in FIG. 3. The processor may be configured to analyze the collected data (illustrated as a and b in FIG. 3, although many more data points would be available), develop a diminishing trend of antioxidant level, and forecast the time left (T) before the antioxidant level reaches the minimum set value ($AO_{min}$): (T) =[(a−b)/t]×(b−$AO_{min}$). This strategy minimizes operating costs and extend equipment lifetime by lubricating equipment only when needed. The processor (16) sends an alert to operation to indicate the time when drainage and refilling of the lube oil reservoir (10) with fresh lube oil will be needed.

Figure 4:
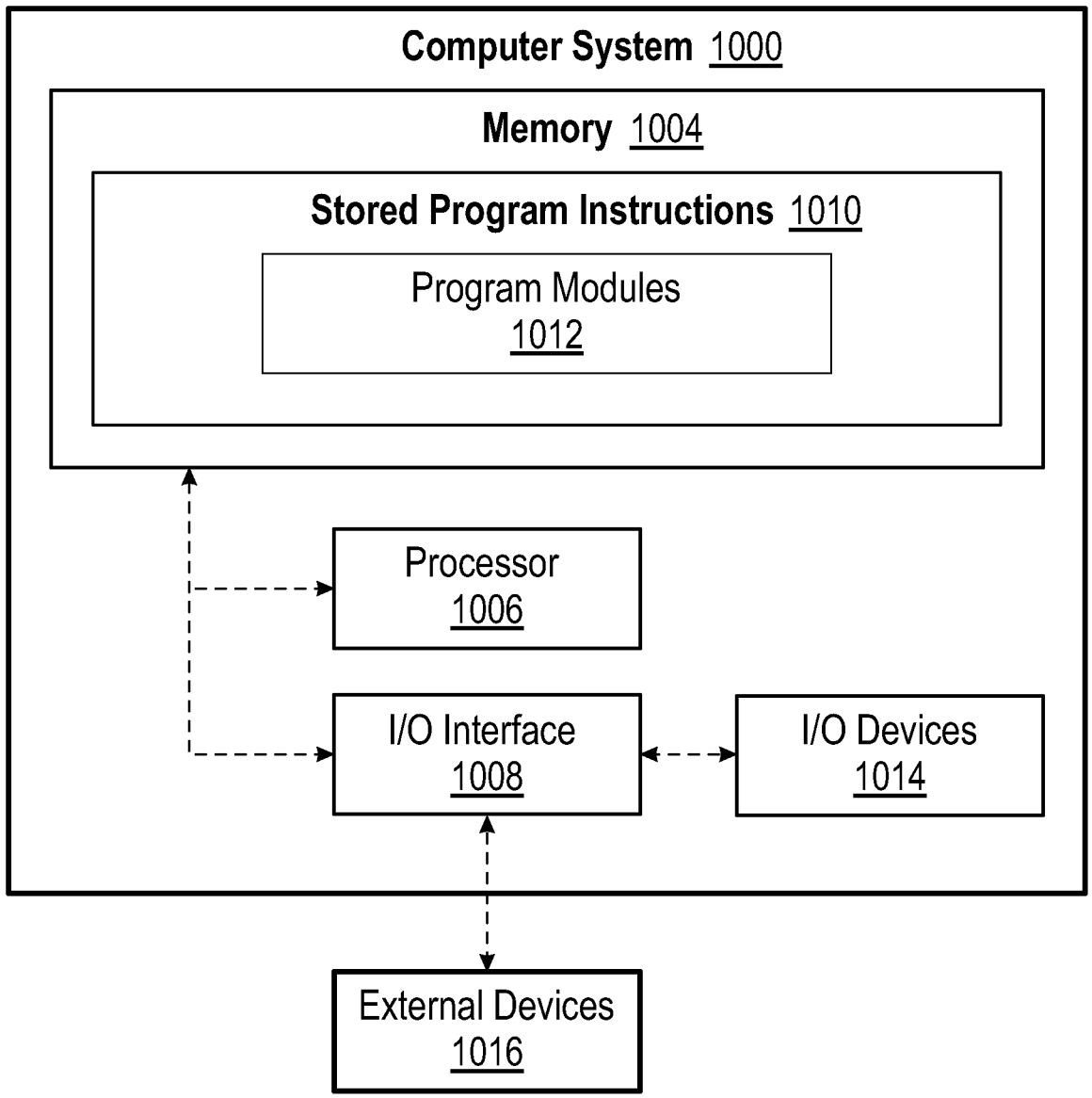
FIG. 4 is a diagram that illustrates an example of a computer system (or "system") according to embodiments herein.

FIG. 4 is a diagram that illustrates an example computer system (or "system") 1000 that can be used to implement the control strategy outlined above and to determine the predictive maintenance strategy in accordance with one or more embodiments. In some embodiments, the system 1000 is a programmable logic controller (PLC). The system 1000 may include a memory 1004, a processor 1006 and an input/output (I/O) interface 1008. The memory 1004 may include non-volatile memory (for example, flash memory, read-only memory (ROM), programmable read-only memory (PROM), erasable programmable read-only memory (EPROM), electrically erasable programmable read-only memory (EEPROM)), volatile memory (for example, random access memory (RAM), static random access memory (SRAM), synchronous dynamic RAM (SDRAM)), or bulk storage memory (for example, CD-ROM or DVD-ROM, hard drives). The memory 1004 may include a non-transitory computer-readable storage medium having stored program instructions 1010. The program instructions 1010 may include program modules 1012 that are executable by a computer processor (for example, the processor 1006) to cause the functional operations described above.

The processor 1006 may be any suitable processor capable of executing program instructions. The processor 1006 may include a central processing unit (CPU) that carries out program instructions (for example, the program instructions of the program modules 1012) to perform the arithmetical, logical, or input/output operations described. The processor 1006 may include one or more processors. The I/O interface 1008 may provide an interface for communication with one or more I/O devices 1014, such as a joystick, a computer mouse, a keyboard, or a display screen (for example, an electronic display for displaying a graphical user interface (GUI)). The I/O devices 1014 may include one or more of the user input devices. The I/O devices 1014 may be connected to the I/O interface 1008 by way of a wired connection (for example, an Industrial Ethernet connection) or a wireless connection (for example, a Wi-Fi connection). The I/O interface 1008 may provide an interface for communication with one or more external devices 1016. In some embodiments, the I/O interface 1008 includes one or both of an antenna and a transceiver.

As described above, embodiments herein integrate separate monitoring, draining and filling control loops, to maintain health of the in-service lube oil. Embodiments herein monitor in-service lube oil online for antioxidant level and may take immediate corrective action by means of automatic partial replacement of in-service lube oil with fresh lube oil. Systems and methods as described herein may advantageously facilitate maintaining the adequate amount of antioxidant level and protect the in-service lube oil from varnish formation. In addition, the system automatically maintains the oil level in the lube oil reservoir. Embodiments herein may also advantageously ensure that the storage tank has always adequate fresh lube oil quantity to carry out the partial refilling.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed is:

1. A system for automatic maintenance of lube oil quality, the system comprising:
    a storage tank for storing a volume of fresh lube oil;
    a lube oil reservoir containing a volume of operational lube oil;
    an oil disposal tank;
    a first controllable flow system for transporting lube oil from the lube oil reservoir to the oil disposal tank;
    a second controllable flow system for transporting fresh lube oil from the storage tank to the lube oil reservoir;
    a level transmitter configured to measure a level of lube oil within the lube oil reservoir;
    an antioxidant sensor configured to measure a concentration of antioxidant level of operational lube oil inside the lube oil reservoir; and
    a control system configured to:
        activate and deactivate the first controllable flow system based upon the concentration of antioxidant measured by the antioxidant sensor; and
        activate and deactivate the second controllable flow system based upon the level of lube oil measured by the level transmitter;
        wherein the control system comprises:
            a first processor configured to activate and deactivate the first controllable flow system based upon the concentration of antioxidant measured by the antioxidant sensor; and
            a second processor configured to activate and deactivate the second controllable flow system based upon the level of lube oil measured by the level transmitter.

2. The system of claim 1, further comprising a lube oil circulation system configured to supply lube oil from the lube oil reservoir to rotating equipment and to return lube oil from the rotating equipment to the lube oil reservoir, the return lube oil being depleted in antioxidant.

3. The system of claim 1, wherein the first controllable flow system comprises a control valve disposed along flow lines fluidly connecting the lube oil reservoir and the oil disposal tank.

4. The system of claim 1, wherein the first controllable flow system consists of a control valve disposed along flow lines fluidly connecting the lube oil reservoir and the oil disposal tank.

5. The system of claim 1, wherein the second controllable flow system comprises a pump disposed along flow lines fluidly connecting the storage tank and the lube oil reservoir.

6. The system of claim 1, wherein the second controllable flow system consists of a pump disposed along flow lines fluidly connecting the storage tank and the lube oil reservoir.

7. The system of claim 1, wherein the control system is configured to activate the first controllable flow system when the antioxidant concentration measured is below a concentration set point, thereby providing a flow of lube oil from the lube oil reservoir to the oil disposal tank.

8. The system of claim 7, wherein the control system is configured to activate the second controllable flow system when the level of lube oil in the lube oil reservoir decreases to a low level set point, thereby providing fresh lube oil from the storage tank to the lube oil reservoir and increasing a concentration of antioxidant within the lube oil reservoir.

9. The system of claim 8, wherein the control system is configured to deactivate the first controllable flow system when the antioxidant concentration is above the concentration set point, thereby stopping the flow of lube oil from the lube oil reservoir to the oil disposal tank.

10. The system of claim 9, wherein the control system is configured to deactivate the second controllable flow system when the level of lube oil in the lube oil reservoir reaches a high level set point, thereby stopping a flow of fresh lube oil from the storage tank to the lube oil reservoir.

11. The system of claim 10, wherein an inlet of the lube oil reservoir configured to receive fresh lube oil from the storage tank is located below a maximum oil level of the lube oil reservoir, and wherein an oil circulating line for an antioxidant sensor is placed near an opening of a drain line for transporting lube oil from the lube oil reservoir to the oil disposal tank.

12. The system of claim 10, wherein the control system is configured to estimate a time at which the concentration of antioxidant in the lube oil reservoir will fall below the concentration set point.

13. The system of claim 12, wherein the control system is further configured to automatically send or display a notification when an estimated volume of fresh lube oil remaining in the storage tank is less than a volume of oil required to fill the lube oil reservoir from the low level set point to the high level set point.

14. A process for automatic maintenance of lube oil quality, the process comprising:
    measuring, with an antioxidant sensor, a concentration of antioxidant contained in a lube oil stored in a lube oil reservoir;
    measuring, with a level sensor, a level of lube oil within the lube oil reservoir;
    automatically activating and deactivating, via a control system, a first controllable flow system based only upon the concentration of antioxidant measured by the antioxidant sensor;
    automatically activating and deactivating, via the control system, a second controllable flow system based only upon the level of lube oil measured by the level sensor; and
    automatically sending or displaying a notification by the control system when the control system estimates a volume of fresh lube oil remaining in a storage tank is less than a volume of oil required to fill the lube oil reservoir from a low level set point to a high level set point.

15. The process of claim 14, wherein the automatically activating the first controllable flow system comprises automatically sending a control signal from the control system to open a flow control valve when the concentration of antioxidant measured is below a concentration set point, thereby initiating flow of lube oil from the lube oil reservoir and decreasing the level of lube oil within the lube oil reservoir.

16. The process of claim 15, wherein the automatically activating the second controllable flow system comprises automatically sending a control signal from the control system to activate a pump when the level of lube oil in the lube oil reservoir decreases to the low level set point, thereby providing fresh lube oil from the storage tank to the lube oil reservoir and increasing a concentration of antioxidant within the lube oil reservoir and a level of lube oil in the lube oil reservoir.

17. The process of claim 16, wherein the automatically deactivating the first controllable flow system comprises automatically sending a control signal from the control system to close the flow control valve when the antioxidant concentration is above the concentration set point, thereby stopping the flow of lube oil from the lube oil reservoir.

18. The process of claim 17, wherein the automatically deactivating the second controllable flow system comprises automatically sending a control signal from the control system to stop the pump when the level of lube oil in the lube oil reservoir reaches the high level set point, thereby stopping a flow of fresh lube oil from the storage tank to the lube oil reservoir.

* * * * *